United States Patent
Kawasaki et al.

(10) Patent No.: US 12,397,281 B2
(45) Date of Patent: Aug. 26, 2025

(54) ADSORBENT, HEAVY METAL REMOVING AGENT, MOLDED BODY USING SAME, AND WATER PURIFIER

(71) Applicant: KURARAY CO., LTD., Kurashiki (JP)

(72) Inventors: Shuji Kawasaki, Okayama (JP); Shuji Matsunaga, Tokyo (JP); Tetsuya Hanamoto, Okayama (JP); Hiroe Yoshinobu, Okayama (JP)

(73) Assignee: KURARAY CO., LTD., Kurashiki (JP)

( * ) Notice: Subject to any disclaimer, the term of this patent is extended or adjusted under 35 U.S.C. 154(b) by 981 days.

(21) Appl. No.: 17/442,164

(22) PCT Filed: Mar. 25, 2020

(86) PCT No.: PCT/JP2020/013483
§ 371 (c)(1),
(2) Date: Sep. 23, 2021

(87) PCT Pub. No.: WO2020/203588
PCT Pub. Date: Oct. 8, 2020

(65) Prior Publication Data
US 2022/0176342 A1    Jun. 9, 2022

(30) Foreign Application Priority Data

Mar. 29, 2019 (JP) .................. 2019-065653
Mar. 29, 2019 (JP) .................. 2019-065654

(51) Int. Cl.
| | | |
|---|---|---|
| *B01J 20/20* | (2006.01) |
| *B01J 20/26* | (2006.01) |
| *B01J 20/28* | (2006.01) |
| *C02F 1/28* | (2023.01) |
| *C02F 101/20* | (2006.01) |

(52) U.S. Cl.
CPC ............. *B01J 20/20* (2013.01); *B01J 20/261* (2013.01); *B01J 20/28004* (2013.01); *B01J 20/28064* (2013.01); *C02F 1/288* (2013.01); *B01J 2220/42* (2013.01); *B01J 2220/46* (2013.01); *B01J 2220/58* (2013.01); *C02F 1/281* (2013.01); *C02F 1/283* (2013.01); *C02F 2101/20* (2013.01)

(58) Field of Classification Search
CPC .... B01J 20/20; B01J 20/261; B01J 20/28004; B01J 20/28064; B01J 2220/42; B01J 2220/46; B01J 2220/58; C02F 1/288; C02F 1/281; C02F 1/283; C02F 2101/20
USPC ........................................................ 502/402
See application file for complete search history.

(56) References Cited

U.S. PATENT DOCUMENTS

| | | |
|---|---|---|
| 2006/0163151 A1 | 7/2006 | Kawasaki et al. |
| 2012/0132578 A1 | 5/2012 | Yoshinobu et al. |
| 2014/0309106 A1 | 10/2014 | Mikuni et al. |
| 2019/0047890 A1 | 2/2019 | Poffet et al. |

FOREIGN PATENT DOCUMENTS

| | | |
|---|---|---|
| JP | H11-347547 A | 12/1999 |
| JP | 2002066312 A | 3/2002 |
| JP | 2003334543 A | 11/2003 |
| JP | 2009208076 A | 9/2009 |
| JP | 4361489 B2 | 11/2009 |
| JP | 2014193454 A | 10/2014 |
| JP | 2015112518 A | 6/2015 |
| JP | 2016019980 A | 2/2016 |
| JP | 2017200670 A | 11/2017 |
| TW | 200415123 A | 8/2004 |
| TW | I485107 B | 5/2015 |
| TW | I585041 B | 6/2017 |
| TW | 201738184 A | 11/2017 |
| WO | WO-2004039494 A1 | 5/2004 |

OTHER PUBLICATIONS

International Search Report issued Jun. 9, 2020 in PCT/JP2020/013483, 3 pages.
Combined Office Action and Search Report issued Mar. 9, 2021 in Taiwanese Patent Application No. 109110432 (with partial English translation), 11 pages.

*Primary Examiner* — Anthony J Zimmer
*Assistant Examiner* — Eric Scott Sherman
(74) *Attorney, Agent, or Firm* — Element IP, PLC

(57) ABSTRACT

An embodiment of the present invention relates to an adsorbent which contains a fine particle compound containing an aluminosilicate compound and activated carbon particles, wherein the fine particle compound containing an aluminosilicate compound has a specific surface area of 300 $m^2/g$ or more and an average particle size of 10 to 200 μm and includes particles having a particle size of 10 μm or less in volume particle size distribution at 10 volume % or less, and the activated carbon particles have a mode diameter of 0.06 to 0.6 mm.

17 Claims, No Drawings

ADSORBENT, HEAVY METAL REMOVING AGENT, MOLDED BODY USING SAME, AND WATER PURIFIER

TECHNICAL FIELD

The present invention relates to an adsorbent, a heavy metal removing agent, and a molded body and a water purifier that are obtained using these adsorbent and heavy metal removing agent.

BACKGROUND ART

Activated carbon has excellent ability to adsorb various contaminants and is thus often used for water purification. In recent years, there has been increasing concern about the quality of drinking water, especially tap water in terms of safety and health, and it is desired to remove harmful substances such as free residual chlorine, trihalomethanes (THM), and musty odor contained in drinking water.

Furthermore, heavy metals, such as lead that is eluted from the lead-containing materials used in water pipes and are contained in tap water and the like in the form of ions, are also harmful substances, and are thus desired to be removed from water. Hence, there is recently a demand for water purifiers which not only provide tasty drinking water but also have excellent performance of removing heavy metal ions as well as excellent performance of removing free residual chlorine and musty odor.

In order to meet demands as described above, it is considered that it is not sufficient to use only activated carbon and it is necessary to use other adsorbents such as inorganic compounds having peculiar adsorbing ability concurrently.

Hitherto, it has been proposed to use aluminosilicate-based inorganic ion exchangers as a method for removing the heavy metals (Patent Literatures 1 to 3).

However, in the invention described in Patent Literature 1, the molecular sieve used as an aluminosilicate-based inorganic ion exchanger exhibits low dispersibility in activated carbon and lack in performance stability in some cases.

The present applicants have carried out research and development of a composite powder body in which a plastic powder is attached to an aluminosilicate-based inorganic compound and a composite adsorbent containing a composite powder body and an adsorptive substance as a means for efficiently removing heavy metals (Patent Literature 4).

Meanwhile, in the field of water purification, there are strict regulations on the amount of aluminum eluted, and elution of aluminum may become a problem in the case of using an aluminosilicate-based inorganic compound. In that regard, as described in Patent Literatures 2 and 3, there is a problem that the elution of aluminum is severe particularly in the early period of the use of filter when an aluminosilicate-based inorganic ion exchanger having a relatively small particle size is used.

Accordingly, an object of the present invention is to provide an adsorbent and a heavy metal removing agent that are capable of suppressing the elution of aluminum while having excellent heavy metal removing performance.

CITATION LIST

Patent Literature

Patent Literature 1: JP 2003-334543 A
Patent Literature 2: JP 11-347547 A
Patent Literature 3: JP 2002-66312 A
Patent Literature 4: JP 4,361,489 B2

SUMMARY OF INVENTION

As a result of diligent studies to solve the above-mentioned problems, the present inventors have found out that the above-mentioned problems can be solved by an adsorbent or heavy metal removing agent having the following configuration, and have further repeatedly carried out research based on the finding to complete the present invention.

The adsorbent according to an aspect of the present invention is an adsorbent which contains a fine particle compound (A) containing an aluminosilicate compound and activated carbon particles, wherein the fine particle compound (A) containing an aluminosilicate compound has a specific surface area of 300 m$^2$/g or more and an average particle size D50 of 3 to 200 μm and includes particles having a particle size of 10 μm or less in volume particle size distribution at 10 volume % or less, and the activated carbon particles have a mode diameter of 0.06 to 0.6 mm.

The adsorbent according to another aspect of the present invention is an adsorbent which contains a fine particle compound (B) containing an aluminosilicate compound, a plastic powder, and activated carbon, wherein the fine particle compound (B) containing an aluminosilicate compound and the plastic powder form composite aggregate particles, and particles having a particle size of 40 μm or less in volume particle size distribution of the composite aggregate particles are 15 volume % or less.

The heavy metal removing agent according to another aspect of the present invention contains a fine particle compound (B) containing an aluminosilicate compound and a plastic powder, and particles having a particle size of 40 μm or less in volume particle size distribution are 15 volume % or less in the heavy metal removing agent.

DESCRIPTION OF EMBODIMENTS

As a result of diligent studies and repeated research on the state of fine particle compounds containing aluminosilicate compounds with regard to the performance of removing heavy metals such as lead ions and the elution of aluminum, the present inventors have found out that there is correlation between the size of the fine particle compound and the proportion (ratio) of the particle size of 10 μm or less and the amount of aluminum eluted, and further carried out research based on the finding to achieve the present invention.

As a result of diligent studies and repeated research on the state of the composite aggregate particles containing a fine particle compound (a1) containing an aluminosilicate compound and a plastic powder (a2) with regard to the performance of removing heavy metals such as lead ions and the elution of aluminum, the present inventors have also found out that there is correlation between the proportion (ratio) of composite aggregate particles having a particle size of 40 μm or less and the amount of aluminum eluted, and further carried out research based on the finding to achieve the present invention.

According to the present invention, it is possible to provide an adsorbent and a heavy metal removing agent that are capable of suppressing the elution of aluminum while having excellent heavy metal removing performance, and a molded body and a water purifier that are obtained using the adsorbent and heavy metal removing agent.

Hereinafter, embodiments of the present invention will be described in detail with reference to specific examples and the like, but the present invention is not limited thereto.

First Embodiment

The adsorbent of the present embodiment contains a fine particle compound (A) containing an aluminosilicate compound and activated carbon particles. The fine particle compound (A) containing an aluminosilicate compound has a specific surface area of 300 m$^2$/g or more and an average particle size D50 of 3 to 200 μm and includes particles having a particle size of 10 μm or less in the volume particle size distribution at 10 volume % or less. The activated carbon particles have a mode diameter of 0.06 to 0.6 mm.

By an adsorbent having such a configuration, it is possible to provide a water purifier and the like that are capable of suppressing the elution of aluminum while having excellent heavy metal removing performance.

<Fine Particle Compound (A)>

The fine particle compound (A) of the present embodiment is an aluminosilicate compound having a large ion exchange capacity and high selectivity for heavy metals.

As the aluminosilicate compound, an A-type or X-type aluminosilicate compound is suitable from the viewpoint of large ion exchange capacity. The product name "Zeomic" that is commercially available from Sinanen Zeomic Co., Ltd. and the like are known.

The fine particle compound (A) containing an aluminosilicate compound in the present embodiment has a specific surface area of 300 m$^2$/g or more. Excellent heavy metal removing performance is obtained when the fine particle compound (A) has such a specific surface area. A more preferable specific surface area is 600 m$^2$/g or more. The upper limit value of the specific surface area is not required to be set in particular, but is preferably 2000 m$^2$/g or less, more preferably 1200 m$^2$/g or less from the viewpoint of availability and versatility. In the present embodiment, the specific surface area is determined from the nitrogen adsorption isotherm by the BET method.

The fine particle compound (A) of the present embodiment has an average particle size D50 of 10 to 200 μm. As the fine particle compound (A) has such an average particle size D50, the fine particle compound (A) exhibits excellent dispersibility in the activated carbon described later and stability of various performances is obtained. Amore preferable average particle size is 10 to 100 μm. In the present embodiment, the average particle size D50 means the 50% particle size in the volume-based cumulative distribution. The numerical value of this average particle size D50 is a value calculated from the particle size distribution (cumulative distribution) measured by the laser diffraction/scattering method. The average particle size D50 can be measured using, for example, a wet particle size distribution measuring instrument (MICROTRAC MT3300EX II manufactured by MicrotracBEL Corp.) described later.

The fine particle compound (A) of the present embodiment includes particles having a particle size of 10 μm or less in the volume particle size distribution at 10 volume % or less. In the present embodiment, the "particle size" means the diameter of a particle. The fact that "particles having a particle size of 10 μm or less in the volume particle size distribution are 10 volume % or less" means that particles having a diameter of 10 μm or less in the volume-based particle size distribution are 10 volume % or less. The ratio of particles having a particle size of 10 μm or less is a value measured by particle size distribution measurement, and can be measured by, for example, a laser diffraction measurement method described later or the like.

The fine particle compound (A) of the present embodiment includes particles having a particle size of 10 μm or less in the volume particle size distribution at 10 volume % or less, preferably 7 volume % or less, more preferably 5 volume % or less.

By using the fine particle compound (A) having a configuration as described above, it is possible to obtain an adsorbent that has heavy metal removing performance and suppresses aluminum elution in a favorably balanced manner.

In the present embodiment, fine powder is removed by using a cyclone apparatus and the like, and it is thus possible to obtain the fine particle compound (A) containing an aluminosilicate compound, in which the proportion of particles having a particle size of 10 μm or less is 10 volume % or less in the particle size distribution (volume particle size distribution).

The volume-based particle size distribution (cumulative distribution) of particle size for determining D50 and the amount (volume percentage) of particles having a particle size of 10 μm or less in the volume particle size distribution in the present embodiment can be measured by the laser diffraction measurement method as follows.

A dispersion in which a substance to be measured (for example, the fine particle compound), a surfactant, and ion exchanged water are mixed together is measured by a penetration method using a laser diffraction/scattering type particle size distribution measuring instrument ("MT3300 II" manufactured by MicrotracBEL Corp.). The dispersion concentration is adjusted so as to fall in the measurement concentration range displayed by the same instrument. As the surfactant at the time of dispersion preparation, "polyoxyethylene(10) octyl phenyl ether" manufactured by FUJIFILM Wako Pure Chemical Corporation is used and an appropriate amount thereof is added so that bubbles, which affect the measurement, are not generated. The analysis conditions are presented below.

(Analysis Conditions)
 Number of measurements; 1 time
 Measurement time; 30 seconds
 Distribution display; volume
 Particle size sorting; standard
 Calculation mode; MT3000 II
 Solvent name; WATER
 Upper limit of measurement; 2000 μm, lower limit of measurement; 0.021 μm
 Residual ratio; 0.00
 Passing material ratio; 0.00
 Residual ratio setting; invalid
 Particle penetration; penetrated
 Refractive index of particles; 1.81
 Particle shape; non-spherical
 Refractive index of solvent; 1.333
 DV value; 0.0150 to 0.0700
 Transmittance (TR); 0.700 to 0.950
(Average particle size D50)

The particle size at which the volume-based cumulative distribution obtained by particle size distribution measurement becomes 50% is taken as the average particle size D50.

(Proportion of Particles Having Particle Size of 10 μm or Less)

The proportion of particles having a particle size of 10 μm or less is determined from the volume-based cumulative distribution obtained by particle size distribution measurement.

In the present embodiment, the silicon dioxide/aluminum oxide ($SiO_2/Al_2O_3$) is preferably 3 or less in the aluminosilicate compound. This provides excellent heavy metal removing performance. Metal analysis is performed using an X-ray fluorescence analyzer to determine the ratio of silicon to aluminum as oxides. For specific metal analysis, the ratio of silicon to aluminum as oxides is determined using a high power X-ray fluorescence analyzer (Axios mAX manufactured by Malvern Panalytical Ltd.).

The activated carbon used in the adsorbent of the present embodiment is only required to be activated carbon obtained by carbonizing and activating a carbonaceous material, and is preferably activated carbon having a specific surface area of several hundred $m^2/g$ or more.

Examples of the carbonaceous material include plant-based materials such as wood, sawdust, charcoal, fruit shells such as coconut shell and walnut shell, fruit seeds, pulp-making by-products, lignin, and molasses, mineral-based materials such as peat, grass charcoal, sub-charcoal, brown coal, bituminous coal, smokeless coal, coke, coal tar, coal pitch, petroleum distillation residue, and petroleum pitch, synthetic materials such as phenol. Saran, and acrylic resin, and natural materials such as recycled fiber (rayon). Among these, it is preferable to use coconut shell activated carbon of a plant-based material.

When powdered and granular activated carbon is used, the size thereof is 0.06 to 0.6 mm as a mode diameter from the viewpoint of harmful substance removing performance, pressure loss, suppression of separation between the fine particle compound and the activated carbon, and the like. In the present embodiment, the "mode diameter" means the mode in the particle size distribution. In the present embodiment, when the mode diameter measured using a laser diffraction/scattering type particle size distribution measuring instrument as described above is 0.5 mm or less, this value is adopted. When the mode diameter measured using a laser diffraction/scattering type particle size distribution measuring instrument exceeds 0.5 mm, the mode diameter is a value measured based on JIS K 1474 (2007). Specifically, the average value of mesh openings, that is the mode, is taken as the mode diameter. For example, in the activated carbon (GW10/32) used in Examples described later, the mode is between 14 mesh and 18 mesh, and 1.0 mm that is the average value of 0.85 mm and 1.18 mm is taken as the mode diameter.

When fibrous activated carbon is used as the activated carbon, it is desirable to use fibrous activated carbon cut into about 1 to 5 mm from the viewpoint of moldability, and it is preferable to use fibrous activated carbon having an iodine adsorption amount of 1200 to 3000 mg/g from the viewpoint of removability of free chlorine.

<Adsorbent>

In the adsorbent of the present embodiment, the proportion of the fine particle compound containing an aluminosilicate compound in the adsorbent is preferably 1 mass % or more and preferably 50 mass % or less, more preferably 20 mass % or less.

The adsorbent is obtained by mixing the above-described fine particle compound and activated carbon. The mixing method is not particularly limited, and a known method can be adopted. This mixture (adsorbent) can be used as a water purification material by being automatically filled as it is, but can also be used as a molded body in the form of a cartridge by being further pressurized and molded. When the mixture (adsorbent) is formed into a molded body, a binder for molding and a non-woven fabric for maintaining the shape of molded body may be used as appropriate. Silver impregnated activated carbon or silver zeolite can also be added to the mixture of the fine particle compound and the activated carbon in order to impart antibacterial properties. The molded body will be described later in detail.

The adsorbent of the present embodiment can also suppress the elution of aluminum as well as has excellent heavy metal removing performance. The use of the adsorbent of the present embodiment provides an excellent advantage that the amount of aluminum eluted can be diminished to less than 100 ppb when water passes through the adsorbent for 1 minute at a space velocity (SV) of 2300 $hr^{-1}$.

Second Embodiment

Next, the adsorbent according to another embodiment of the present invention is an adsorbent which contains a fine particle compound (B) containing an aluminosilicate compound, a plastic powder, and activated carbon, wherein the fine particle compound (B) containing an aluminosilicate compound and the plastic powder form composite aggregate particles and particles having a particle size of 40 μm or less in the volume particle size distribution of the composite aggregate particles are 15 volume % or less.

By an adsorbent having such a configuration as well, it is possible to provide a water purifier and the like that are capable of suppressing the elution of aluminum while maintaining excellent heavy metal removing performance.

In the present embodiment, the adsorbent contains the fine particle compound (B) containing an aluminosilicate compound and the plastic powder, and these form composite aggregate particles. The composite aggregate particles are not particularly limited as long as they are a composite in which the plastic powder is attached to at least a part of the surface of the fine particle compound (B). However, the composite aggregate particles may be, for example, in a form so that the plastic powder is attached to at least a part of the surface of the fine particle compound (B) to bond the fine particle compounds (B) to each other.

<Composite Aggregate Particles>

The fine particle compound (B) of the present embodiment is an aluminosilicate compound having a large ion exchange capacity and high selectivity for heavy metals.

As the aluminosilicate compound, an A-type or X-type aluminosilicate compound is suitable from the viewpoint of large ion exchange capacity. The product name "Zeomic" that is commercially available from Sinanen Zeomic Co., Ltd. and the like are known.

The fine particle compound (B) containing an aluminosilicate compound in the present embodiment preferably has a specific surface area of 300 $m^2/g$ or more. Superior heavy metal removing performance is obtained when the fine particle compound (B) has such a specific surface area. A more preferable specific surface area is 600 $m^2/g$ or more. The upper limit value of the specific surface area is not required to be set in particular, but is preferably 2000 $m^2/g$ or less, more preferably 1200 $m^2/g$ or less from the viewpoint of availability and versatility.

The fine particle compound (B) of the present embodiment includes particles having a particle size of 10 μm or less in the volume particle size distribution at 10 volume % or less, preferably 7 volume % or less, still more preferably 5 volume % or less. The specific surface area and the particles having a particle size of 10 μm or less in the volume particle size distribution can be determined in the same manner as in the first embodiment described above.

Examples of the plastic powder used in the present embodiment include powders of various thermoplastic resins such as polyethylene, polypropylene, polystyrene, ethylene vinyl acetate copolymer, acrylonitrile butadiene styrene, polyesters such as polyethylene terephthalate, polybutylene terephthalate, and polymethyl methacrylate, and polyamide such as nylon, and thermosetting resins such as furan resin and phenol resin. Among these, a powder of a thermoplastic resin can be preferably used from the viewpoint that aggregate particles can be formed by heating. Among these thermoplastic resins, polyethylene is the most preferable.

When a thermoplastic resin powder having a too small melt flow rate (MFR) is used, the fine particle compound is not easily attached to the surface of the thermoplastic resin in some cases. On the other hand, when a thermoplastic resin powder having a too large melt flow rate (MFR) is used, the thermoplastic resin cannot retain the shape of particles but flows when being heated to a temperature equal to or more than the melting point in some cases. Hence, it is preferable to use a thermoplastic resin powder having a MFR of 0.02 g/10 minutes or more and a thermoplastic resin powder having a MFR of 40 g/10 minutes or less. MFR is the exit velocity of a thermoplastic resin extruded from an orifice having prescribed diameter and length at constant temperature and pressure, and is specifically measured in conformity to JIS K 7210 (2014).

For the composite aggregate particles of the present embodiment, it is first necessary to attach the plastic powder to the fine particle compound (B). The fine particle compound (B) may be in the form of powder or granules, but the average particle size (diameter) of the fine particle compound (B) is preferably 200 µm or less, preferably 100 m or less since the adsorption rate when the fine particle compound (B) is formed into a composite adsorbent tends to be slow in a case where the particle size is too large. In particular, it is desirable that the particle size of the fine particle compound (B) is set to 3 µm to 80 µm from the viewpoint of support retention.

The particle size of the plastic powder used in the present embodiment is related to the particle size of the fine particle compound (B), and a large plastic powder may be selected when a large fine particle compound (B) is used and a small plastic powder may be selected when a small fine particle compound (B) is used. From this point of view, it is desirable that the average particle size of the plastic powder is 0.1 µm to 200 µm, preferably 1 µm to 100 µm.

In order to attach the plastic powder to the fine particle compound (B), means, for example, far-infrared heating and a heating and drying furnace can be used. The attachment in the present embodiment means all states in which the fine particle compound and the plastic powder are firmly fixed to each other such as heat fusion by melting and heating in addition to bonding using an adhesive and the like, but attachment by heat fusion is preferable from the viewpoint of reliable fixing.

More specifically, for example, a mixture is obtained by uniformly mixing the plastic powder with the fine particle compound (B) so as to have a content of 3% to 40% by weight, this mixture is heated to a temperature equal to or more than the melting point of the plastic powder, and crushed before being cooled, and sieving is performed to obtain composite aggregate particles in which particles having a particle size of 40 µm or less in the volume particle size distribution are 15 volume % or less.

The amount of plastic powder in the composite aggregate particles can also be estimated by measuring the volatile matter content. The measurement of volatile matter content is performed by a method in which a sample dried at 110° C. for 3 hours is first weighed at room temperature, then is left in a furnace at 930° C. for 7 minutes in a state of being placed in a porcelain crucible and covered, and cooled, and the weight of the residual sample is then measured. Since the plastic powder decomposes and volatilizes at this temperature, the lost weight is taken as the plastic powder content.

After sieving, particles smaller than a predetermined sieving standard can be reused. The average particle size of the composite aggregate particles is preferably set to 50 µm or more and 1 mm or less from the viewpoint of pressure loss and handleability, and is still more preferably 75 µm or more and 500 µm or less.

In the present embodiment, an adsorbent in which the volume percentage of the composite aggregate particle having a particle size of 40 µm or less is 15 volume % or less can be obtained by adjusting the proportion of particles with a particle size of 10 µm or less contained in the fine particle compound used or performing sieving using a sieving apparatus of an appropriate size. The adjustment of fine particle compound can be efficiently performed by using a cyclone apparatus and the like.

The method for measuring the particle size distribution in the present embodiment is as follows.

The particle sizes (average particle sizes or the like) of the fine particle compound (B), plastic powder, adsorbent (composite aggregate particles), and activated carbon are measured by a laser diffraction measurement method. As the method, the same instrument and conditions as those in the method described in the first embodiment above are used. The proportion (volume percentage) of particles having a particle size of 40 µm or less can be determined from the cumulative distribution in the particle size distribution (volume particle size distribution) obtained by this measurement. The average particle size means a particle size to be 50% in the volume-based cumulative distribution.

<Activated Carbon>

As the activated carbon used in the present embodiment, the same activated carbon as that used in the above-described first embodiment can be used.

<Adsorbent>

In the adsorbent of the present embodiment, the proportion of the composite aggregate particles in the adsorbent is preferably 1 mass % or more and preferably 50 mass % or less, more preferably 20 mass % or less.

The adsorbent is obtained by mixing the above-described composite aggregate particles and activated carbon. The mixing method is not particularly limited, and a known method can be adopted. This mixture (adsorbent) can be used as a water purification material by being automatically filled as it is, but can also be used as a molded body in the form of a cartridge by being further pressurized and molded. The molded body will be described later in detail.

The adsorbent of the present embodiment can also suppress the elution of aluminum as well as has excellent heavy metal removing performance. The use of the adsorbent of the present embodiment provides an excellent advantage that the amount of aluminum eluted can be diminished to less than 100 ppb when water passes through the adsorbent for 1 minute at a space velocity (SV) of 2300 $hr^{-1}$.

Third Embodiment

<Heavy Metal Removing Agent>

The heavy metal removing agent of the present embodiment contains a fine particle compound (B) containing an aluminosilicate compound and a plastic powder, and particles having a particle size of 40 μm or less in the volume particle size distribution are 15 volume % or less in the heavy metal removing agent.

By forming a heavy metal removing agent having such a configuration into an adsorbent, it is possible to provide a water purifier and the like that are capable of suppressing the elution of aluminum while maintaining excellent heavy metal removing performance.

The heavy metal removing agent of the present embodiment includes particles having a particle size of 40 μm or less in the volume particle size distribution at 15 volume % or less, still more preferably 10 volume % or less.

In the present embodiment, the heavy metal removing agent contains the fine particle compound (B) containing an aluminosilicate compound and the plastic powder, and these form composite aggregate particles. As the composite aggregate particles, the same composite aggregate particles as those used in the second embodiment described above can be used. The average particle size of the heavy metal removing agent of the present embodiment is preferably set to 50 μm or more and 1 mm or less from the viewpoint of pressure loss and handleability, and is still more preferably 75 μm or more and 500 μm or less.

In the present embodiment, a heavy metal removing agent in which the volume percentage of the composite aggregate particle having a particle size of 40 μm or less is 15 volume % or less can be obtained by adjusting the proportion of particles with a particle size of 10 μm or less contained in the fine particle compound used in the heavy metal removing agent or performing sieving using a sieving apparatus of an appropriate size. The adjustment of fine particle compound can be efficiently performed by using a cyclone apparatus and the like.

The particle size distribution in the present embodiment can also be determined in the same manner as in the first and second embodiments described above.

<Adsorbent>

The present invention also includes an adsorbent containing the heavy metal removing agent of the present embodiment and activated carbon.

In this case, as the activated carbon used, the same activated carbon as that used in the above-described first embodiment can be used.

In the adsorbent of the present embodiment, the proportion of the composite aggregate particles in the adsorbent is preferably 1 mass % or more and preferably 50 mass % or less, more preferably 20 mass % or less. The adsorbent is obtained by mixing the above-described composite aggregate particles and activated carbon. The mixing method is not particularly limited, and a known method can be adopted. This mixture (adsorbent) can be used as a water purification material by being automatically filled as it is, but can also be used as a molded body in the form of a cartridge by being further pressurized and molded. The molded body will be described later in detail.

The adsorbent of the present embodiment can also suppress the elution of aluminum as well as has excellent heavy metal removing performance. The use of the adsorbent of the present embodiment provides an excellent advantage that the amount of aluminum eluted after 1 minute can be diminished to less than 100 ppb when the amount of the heavy metal removing agent in the adsorbent is set to 2 mass % and filtration is performed at a space velocity (SV) of 2300 $hr^{-1}$. At this time, it is preferable to select the heavy metal remover and activated carbon so that the amount of aluminum eluted after 1 minute is less than 100 ppb in the case of performing filtration at a space velocity (SV) of 2300 $hr^{-1}$ when the proportion of the heavy metal removing agent to the adsorbent is 2 mass %. The proportion of the heavy metal removing agent in the adsorbent can be appropriately changed in the actual form of use of the adsorbent.

<Molded Body>

Each of the above-described adsorbents can be used as a water purification material by being automatically filled as it is, but can also be used as a molded body in the form of a cartridge by being further pressurized and molded. When the adsorbent is formed into a molded body, a binder for molding and a non-woven fabric for maintaining the shape of molded body may be used as appropriate. Silver impregnated activated carbon or silver zeolite can also be added to the mixture of the fine particle compound and the activated carbon in order to impart antibacterial properties.

Specifically, a cylindrical non-woven fabric is placed in a mold for molding (a tubular mold having a large number of small holes for suction) described in FIG. 1 of JP 3,516,811 B2, and a slurry in which tap water is added to the adsorbent and a fibrous binder is sucked into the mold and molded. The molded product is removed from the die and dried to obtain a molded body. As the cylindrical non-woven fabric, for example, "MF FILTER" manufactured by ASAHI FIBER INDUSTRY CO., LTD. can be used. As the fibrous binder, for example, "fibrillated acrylic pulp Bi-PUL/F" manufactured by Japan Exlan Co., Ltd. can be used. A spunbond non-woven fabric may be wrapped around the outer periphery of the molded body. In order to prevent the inflow of water from the raw water side to the filtered water side, sealing materials such as rubber and resin are fit to the end portion of the molded body in some cases.

<Water Purifier>

The water passing conditions are not particularly limited when each adsorbent as described above is filled in a container (column) and the container (column) is used as a water purifier, but water is allowed to pass through the water purifier at a space velocity (SV) of, for example, 50 to 4000 $hr^{-1}$ so that the pressure loss does not become too large. The adsorbent of the present embodiment has a high adsorption rate and thus exerts the performance at a SV of 100 $hr^{-1}$ or more and further a flow velocity of 1000 $hr^{-1}$ or more as well, and the water purifier column can be thus significantly miniaturized.

The molded body and water purifier of the present embodiment have excellent heavy metal removing performance and can suppress the amount of aluminum eluted and are thus extremely useful for industrial use.

As described above, the present specification discloses various aspects of technology, of which the main technologies are summarized below.

The adsorbent according to an aspect of the present invention is an adsorbent which contains a fine particle compound containing an aluminosilicate compound and activated carbon particles and, wherein the fine particle compound containing an aluminosilicate compound has a specific surface area of 300 $m^2/g$ or more and an average particle size D50 of 3 to 200 μm and includes particles having a particle size of 10 μm or less in volume particle size distribution at 10 volume % or less, and the activated carbon particles have a mode diameter of 0.06 to 0.6 mm.

By such a configuration, it is possible to provide an adsorbent that is capable of suppressing the elution of aluminum while having excellent heavy metal removing performance.

In the adsorbent, the silicon dioxide/aluminum oxide ($SiO_2/Al_2O_3$) is preferably 3 or less in the aluminosilicate compound. It is considered that this makes it possible to more reliably suppress the elution of aluminum.

The adsorbent according to another aspect of the present invention is an adsorbent which contains a fine particle compound (B) containing an aluminosilicate compound, a plastic powder, and activated carbon, wherein the fine particle compound (B) containing an aluminosilicate compound and the plastic powder form composite aggregate particles, and particles having a particle size of 40 μm or less in volume particle size distribution of the composite aggregate particles are 15 volume % or less.

By such a configuration, it is possible to provide an adsorbent that is capable of suppressing the elution of aluminum while having excellent heavy metal removing performance.

In the adsorbent, the fine particle compound (B) containing an aluminosilicate compound has a specific surface area of 300 m²/g or more and an average particle size D50 of 3 to 200 μm and includes particles having a particle size of 10 μm or less in volume particle size distribution at 10 volume % or less. The activated carbon is preferably activated carbon particles having a mode diameter of 0.06 to 0.6 mm.

In the adsorbent according to the two embodiments described above, it is preferable that the amount of aluminum eluted after 1 minute is less than 100 ppb when a liquid is allowed to pass through the adsorbent at a space velocity (SV) of 2300 hr⁻¹.

The heavy metal removing agent according to still another aspect of the present invention contains a fine particle compound (B) containing an aluminosilicate compound and a plastic powder, and particles having a particle size of 40 μm or less in volume particle size distribution are 15 volume % or less in the heavy metal removing agent.

By such a configuration, it is possible to provide a heavy metal removing agent that is capable of suppressing the elution of aluminum while maintaining excellent performance of removing heavy metals and the like.

The average particle size of the heavy metal removing agent is preferably 50 μm to 1 mm. It is considered that this provides superior properties in terms of pressure loss and handleability.

In the heavy metal removing agent, the fine particle compound (B) containing an aluminosilicate compound has a specific surface area of 300 m²/g or more and an average particle size D50 of 3 to 200 μm and includes particles having a particle size of 10 μm or less in volume particle size distribution at 10 volume % or less.

The adsorbent according to another embodiment contains the heavy metal removing agent and activated carbon. In this adsorbent, it is preferable that the amount of aluminum eluted after 1 minute is less than 100 ppb when the proportion of the heavy metal removing agent to the adsorbent is set to 2 mass % and filtration is performed at a space velocity (SV) of 2300 hr⁻¹.

In the adsorbent according to each embodiment described above, it is preferable that the activated carbon is coconut shell activated carbon. This provides an advantage that THM can also be adsorbed and removed in addition to chlorine odor and musty odor.

In the adsorbent, it is preferable that the proportion of the fine particle compound to the adsorbent is 1% to 50 mass %. This provides an advantage that the adsorption and removal of heavy metals and the adsorption and removal of THM in addition to chlorine odor and musty odor are possible in a well-balanced manner.

In the adsorbent, it is preferable that the amount of aluminum eluted after 1 minute is less than 100 ppb when a liquid is allowed to pass through the adsorbent at a space velocity (SV) of 2300 hr⁻¹.

The present invention also includes a molded body containing the adsorbent and a water purifier including the adsorbent.

EXAMPLES

Hereinafter, the present invention will be described in more detail based on Examples. However, the present invention is not limited by the following Examples at all.

Test Example 1

Example 1

An adsorbent (proportion of aluminosilicate compound: about 2 mass %) of Example 1 was obtained by uniformly mixing 0.64 g of an aluminosilicate compound ("Zeomic" LH210N manufactured by Sinanen Zeomic Co., Ltd., average particle size: 32 μm) as a fine particle compound and 32.3 g of activated carbon ("KURARAY COAL" GW60/150 manufactured by KURARAY CO., LTD., mode diameter: 0.23 mm, specific surface area: 800 m²/g).

Comparative Examples 1 and 2

Adsorbents of Comparative Examples were obtained in the same manner as in Example 1 except that an aluminosilicate-based compound ("Zeomic" LGK10T manufactured by Sinanen Zeomic Co., Ltd., average particle size: 9 μm) and an aluminosilicate-based compound ("Zeomic" LGK210T manufactured by Sinanen Zeomic Co., Ltd., average particle size: 45 μm) were used as fine particle compounds.

<Evaluation Test>

The specific surface area of aluminosilicate compound was measured by the method described above. The average particle size D50 of aluminosilicate compound and the proportion (volume percentage) of particles having a particle size of 10 μm or less in the volume particle size distribution in the aluminosilicate compound were calculated from the results of the particle size distribution measurement performed as described above. The mode diameter of activated carbon was also measured by the method described above.

The water passing test was conducted by filling the adsorbent of each of Examples and Comparative Examples in a 60 ml column and allowing raw water to pass through the column at a flow velocity of 2.3 liters (L)/min (SV: 2300 hr⁻¹).

With regard to the removal rate of lead ions, the adsorbent was filled in a 60 ml column, raw water containing soluble lead at 50 ppb (lead nitrate was added to adjust the lead ion concentration to 50 ppb) was allowed to pass through the column at a flow velocity of 2.3 liters (L)/min (SV: 2300 hr⁻¹), and the removal rate was calculated from the lead ion concentration. The lead ion removing performance was evaluated by determining the amount of liquid passing (L) in which the removal rate of lead ion was 80% and the amount of liquid passing (L/ml) per unit volume of the adsorbent (per unit volume of the column).

The amount of aluminum eluted was determined from the difference between the aluminum concentration in the raw water and the aluminum concentration after 1 minute of water passing when water was allowed to pass under the above conditions.

The results are presented in Table 1, respectively.

TABLE 1

| | Aluminosilicate compound | | | | Activated carbon | |
|---|---|---|---|---|---|---|
| | Product name | Average particle size D50 um | Volume percentage of 10 μm or smaller particles | Specific surface area m²/g | Product name | Mode diameter mm |
| Example 1 | "Zeomic" LH210N | 32 | 0 | 772 | "KURARAY COAL" GW60/150 | 0.23 |
| Comparative Example 1 | "Zeomic" LGK10T | 9 | 61 | 52 | "KURARAY COAL" GW60/150 | 0.23 |
| Comparative Example 2 | "Zeomic" LGK210T | 45 | 0 | 40 | "KURARAY COAL" GW60/150 | 0.23 |

| | Evaluation | | | | | |
|---|---|---|---|---|---|---|
| | Compound ratio (wt) of aluminosilicate compound/ activated carbon | Volume ml | SV/ hr | Amount of aluminum eluted after 1 minute ppb | Lead ion removing performance L | L/ml |
| Example 1 | 2/98 | 60 | 2300 | 5 | 160 | 2.7 |
| Comparative Example 1 | 2/98 | 60 | 2300 | 814 | 80 | 1.3 |
| Comparative Example 2 | 2/98 | 60 | 2300 | 10 | 50 | 0.8 |

<Discussion>

From the results in Table 1, it was confirmed that the adsorbents of Examples were capable of suppressing the elution of aluminum while exerting excellent lead removing performance.

On the other hand, in the adsorbent of Comparative Example 1 in which an aluminosilicate-based compound having a large proportion (volume percentage) of particles having a particle size of 10 μm or less was used, it was found that the elution of aluminum was not sufficiently suppressed. In the adsorbent of Comparative Example 2 in which an aluminosilicate-based compound having a small specific surface area was used, sufficient lead removing performance was not obtained.

Example 2 and Comparative Examples 3 to 5

Adsorbents of Example 2 and Comparative Examples 3 to 5 were obtained in the same manner as in Example 1 except that an aluminosilicate compound ("Zeomic" LH210N manufactured by Sinanen Zeomic Co., Ltd.) was crushed using a ball mill and the crushed products (1) to (4) of aluminosilicate-based compound having the average particle size D50 values and the proportion (volume percentage) values of particles having a particle size of 10 μm or less presented in Table 2 were used as fine particle compounds.

Each of the obtained adsorbents was evaluated by the same method as in Example 1. The results are presented in Table 2, respectively.

TABLE 2

| | Aluminosilicate compound | | | | Activated carbon | |
|---|---|---|---|---|---|---|
| | Product name | Average particle size D50 um | Volume percentage of 10 μm or smaller particles | Specific surface area m²/g | Product name | Mode diameter mm |
| Example 2 | "Zeomic" LH210N-crushed 1 | 30 | 6 | 754 | "KURARAY COAL" GW60/150 | 0.23 |
| Comparative Example 3 | "Zeomic" LH210N-crushed 2 | 27 | 13 | 730 | "KURARAY COAL" GW60/150 | 0.23 |
| Comparative Example 4 | "Zeomic" LH210N-crushed 3 | 24 | 21 | 712 | "KURARAY COAL" GW60/150 | 0.23 |
| Comparative Example 5 | "Zeomic" LH210N-crushed 4 | 17 | 34 | 679 | "KURARAY COAL" GW60/150 | 0.23 |

| | Evaluation | | | | | |
|---|---|---|---|---|---|---|
| | Compound ratio (wt) of aluminosilicate compound/ activated carbon | Volume ml | SV/ hr | Amount of aluminum eluted after 1 minute ppb | Lead ion removing performance L | L/ml |
| Example 2 | 2/98 | 60 | 2300 | 64 | 180 | 3.0 |
| Comparative Example 3 | 2/98 | 60 | 2300 | 141 | 160 | 2.7 |

TABLE 2-continued

| | | | | | | |
|---|---|---|---|---|---|---|
| Comparative Example 4 | 2/98 | 60 | 2300 | 188 | 150 | 2.5 |
| Comparative Example 5 | 2/98 | 60 | 2300 | 246 | 130 | 2.2 |

<Discussion>

From the results in Table 2, it was found that the amount of aluminum eluted also increased as the average particle size of the fine particle compound decreased. It was also confirmed that the amount of aluminum eluted was suppressed in an excellently balanced manner when particles having a particle size of 10 μm or less was 10% or less in the volume particle size distribution.

Comparative Example 6

An adsorbent of Comparative Example 6 was obtained in the same manner as in Example 1 except that the activated carbon was changed to "KURARAY COAL" GW10/32 (mode diameter: 1.0 mm) manufactured by KURARAY CO., LTD.

Comparative Example 7

An adsorbent of Comparative Example 7 was obtained in the same manner as in Example 1 except that one (mode diameter: 0.044 mm) obtained by crushing "KURARAY COAL" GW60/150 manufactured by KURARAY CO., LTD. until the average particle size (D50) became about 20 μm was used as activated carbon.

Each of the obtained adsorbents was evaluated by the same method as in Example 1. The results are presented in Table 3, respectively.

increased during water passing and water was not able to flow at the set flow velocity of 2.3 liters (L)/min (SV: 2300 hr$^{-1}$).

Test Example 2

Example 3

Uniformly mixed were 1 kg of aluminosilicate compound ("Zeomic" LH210N manufactured by Sinanen Zeomic Co., Ltd., average particle size: 32 μm) (referred to as aluminosilicate 1) as a fine particle compound and 75 g of polyethylene (PE) powder ("FLO-THENE" UF-1.5N manufactured by SUMITOMO SEIKA CHEMICALS CO., LTD., MFR: 1.4 g/10 minutes, melting point: 110° C., average particle size: 20 μm) as a plastic powder. This mixture was heated at a temperature of 160° C. for 1 hour using a heating dryer and then crushed using a crushing machine while maintaining the temperature at 60° C. or higher. Thereafter, the crushed product was cooled to room temperature and sieving was performed using a sieving machine. By changing the mesh size, a heavy metal removing agent having an average particle size and a volume percentage of particles with a particle size of 40 pun or less as presented in Table 1 was obtained. The volatile matter content (PE content) was 23%.

Examples 4 to 6

Heavy metal removing agents having average particle sizes and volume percentages of particles with a particle size

TABLE 3

| | Aluminosilicate compound | | | | Activated carbon | |
|---|---|---|---|---|---|---|
| | Product name | Average particle size D50 um | Volume percentage of 10 μm or smaller particles | Specific surface area m²/g | Product name | Mode diameter mm |
| Comparative Example 6 | "Zeomic" LH210N | 32 | 0 | 772 | "KURARAY COAL" GW10/32 | 1.0 |
| Comparative Example 7 | "Zeomic" LH210N | 32 | 0 | 772 | "KURARAY COAL" GW60/150 | 0.044 |

| | | Evaluation | | | | |
|---|---|---|---|---|---|---|
| | Compound ratio (wt) of aluminosilicate compound/ activated carbon | Volume ml | SV/ hr | Amount of aluminum eluted after 1 minute ppb | Lead ion removing performance L | L/ml |
| Comparative Example 6 | 2/98 | 60 | 2300 | 3 | 90 | 1.5 |
| Comparative Example 7 | 2/98 | 60 | 2300 | Not flowing | | |

DISCUSSION

From the results in Table 3, it was found that separation occurred when activated carbon was mixed with a fine particle compound or during water passing in a case where the mode diameter of the activated carbon used was large, and the lead removing performance thus decreased. In a case where the mode diameter was too small, the pressure of 40 μm or less as presented in Table 4 were obtained in the same manner as in Example 3 except that an aluminosilicate compound ("Zeomic" LH210N manufactured by Sinanen Zeomic Co., Ltd.) was crushed using a roll mill and fine particle compounds (aluminosilicates 2, 3, and 4, respectively) having an average particle size of 30 μm (Example 4), 27 μm (Example 5), and 24 μm (Example 6) were used as fine particle compounds. The volatile matter content (PE content) was 23%.

Comparative Example 8

A heavy metal removing agent having an average particle size and a volume percentage of particles with a particle size of 40 μm or less as presented in Table 4 was obtained in the same manner as in Example 3 except that an aluminosilicate compound ("Zeomic" LH210N manufactured by Sinanen Zeomic Co., Ltd.) was crushed using a roll mill and a fine particle compound (aluminosilicate 5) having an average particle size of 17 μm (Comparative Example 8) was used as a fine particle compound. The volatile matter content (PE content) was 23%.

Comparative Example 9

A heavy metal removing agent having an average particle size and a proportion of particles having a particle size of 40 μm or less as presented in Table 4 was obtained in the same manner as in Example 3 except that an aluminosilicate compound ("Zeomic" LGK10T manufactured by Sinanen Zeomic Co., Ltd., average particle size: 9 μm) (referred to as aluminosilicate 6) was used as a fine particle compound. The volatile matter content (PE content) was 23%.

<Evaluation Test>

An adsorbent of each of Examples and Comparative Examples was obtained by uniformly mixing 0.64 g of the heavy metal removing agent of each of Examples and Comparative Examples thus obtained and 32.3 g of activated carbon ("KURARAY COAL" GW60/150 manufactured by KURARAY CO., LTD., particle size: 0.25 mm to 0.1 mm, specific surface area: 800 m²/g).

The proportion (volume percentage) of 40 μm or smaller particles in the heavy metal removing agent was calculated from the above-described (particle size distribution) measurement results.

With regard to the lead ion removing performance, each adsorbent was filled in a 60 ml column, raw water containing soluble lead at 50 ppb (lead nitrate was added to adjust the lead ion concentration to 50 ppb) was allowed to pass through the column at a flow velocity of 2.3 liters (L)/min (SV: 2300 $hr^{-1}$), and the removal rate of lead ion was calculated from the lead ion concentration. The amount of liquid passing (L) in which this removal rate of lead ion was 80% and the amount of liquid passing (L/ml) per unit volume of the adsorbent (column) were evaluated as the lead ion removing performance.

The amount of aluminum eluted was determined from the difference between the aluminum concentration in the raw water and the aluminum concentration after 1 minute of water passing when water was allowed to pass under the above conditions.

The results are presented in Table 4, respectively.

TABLE 4

| | Fine particle compound (a1) | Heavy metal removing agent | | | |
|---|---|---|---|---|---|
| | | Compound ratio | | | Volume |
| | Average particle size um | (wt) of fine particle compound (a1)/ plastic powder (s2) | Volatile matter content % | Average particle size um | percentage of 40 μm or smaller particles |
| Example 3 | Aluminosilicate 1 — 32 | 10 | 23 | 201 | 0 |
| Example 4 | Aluminosilicate 2 — 30 | 10 | 23 | 145 | 4 |
| Example 5 | Aluminosilicate 3 — 27 | 10 | 23 | 119 | 4 |
| Example 6 | Aluminosilicate 4 — 24 | 10 | 23 | 101 | 11 |
| Comparative Example 8 | Aluminosilicate 5 — 17 | 10 | 23 | 77 | 22 |
| Comparative Example 9 | Aluminosilicate 6 — 9 | 10 | 23 | 88 | 19 |

| | Adsorbent | | Evaluation | | | |
|---|---|---|---|---|---|---|
| | Activated carbon | Compound ratio (wt) of heavy metal removing agent/ activated carbon | Volume ml | SV/ hr | Amount of aluminum eluted after 1 minute ppb | Lead ion removing performance | |
| | | | | | | L | L/ml |
| Example 3 | GW60/150 | 2/98 | 60 | 2300 | 3 | 150 | 2.5 |
| Example 4 | GW60/150 | 2/98 | 60 | 2300 | 19 | 200 | 3.3 |
| Example 5 | GW60/150 | 2/98 | 60 | 2300 | 35 | 210 | 3.5 |
| Example 6 | GW60/150 | 2/98 | 60 | 2300 | 93 | 200 | 3.3 |
| Comparative Example 8 | GW60/150 | 2/98 | 60 | 2300 | 183 | 260 | 4.3 |
| Comparative Example 9 | GW60/150 | 2/98 | 60 | 2300 | 122 | 90 | 1.5 |

<Discussion>

From the results in Table 4, it was confirmed that the adsorbents, in which heavy metal removing agents of Examples were used, were capable of suppressing the elution of aluminum while exerting excellent lead removing performance.

On the other hand, it was found that the adsorbents, in which heavy metal removing agents of Comparative Examples not satisfying the constituents of the present invention were used, were not capable of sufficiently suppressing the elution of aluminum.

From the above results, it is indicated that it is possible to provide an adsorbent, a water purification material, and the like that suppress the elution of aluminum while maintaining a significantly excellent lead removal rate by using the heavy metal removing agent of the present invention.

This application is based on Japanese Patent Application No. 2019-65653 and Japanese Patent Application No. 2019-

65654 filed on Mar. 29, 2019, the contents of which are included in the present application.

In order to express the present invention, the present invention described above appropriately and sufficiently through the embodiments with reference to specific examples and the like. However, it should be recognized by those skilled in the art that changes and/or improvements of the above-described embodiments can be readily made. Accordingly, changes or improvements made by those skilled in the art shall be construed as being included in the scope of the claims unless otherwise the changes or improvements are at the level which departs from the scope of the appended claims.

INDUSTRIAL APPLICABILITY

The present invention has a wide range of industrial applicability in technical fields of adsorbents, heavy metal removing agents, water purification, filters and the like.

The invention claimed is:

1. An adsorbent comprising:
a fine particle compound (A) comprising an aluminosilicate compound; and
activated carbon particles;
wherein:
the fine particle compound (A) has a specific surface area of 300 m²/g or more and an average particle size D50 of 3 to 200 µm;
the fine particle compound (A) comprises particles having a particle size of 10 µm or less in a volume particle size distribution at 10 volume % or less;
the activated carbon particles have a mode diameter of 0.06 to 0.6 mm; and
a ratio of silicon to aluminum as oxides ($SiO_2/Al_2O_3$) in the aluminosilicate compound is 3 or less.

2. The adsorbent according to claim 1, wherein the fine particle compound (A) is present in the adsorbent in an amount of 1 to 50 mass %.

3. An adsorbent comprising:
a fine particle compound (B) comprising an aluminosilicate compound;
a plastic powder; and
activated carbon;
wherein:
the fine particle compound (B) and the plastic powder form composite aggregate particles;
the composite aggregate particles comprise particles having a particle size of 40 µm or less in a volume particle size distribution at 15 volume % or less; and
an amount of aluminum eluted after 1 minute when a liquid passes through the adsorbent at a space velocity (SV) of 2300 hr⁻¹ is less than 100 ppb.

4. The adsorbent according to claim 3, wherein:
the fine particle compound (B) has a specific surface area of 300 m²/g or more and an average particle size D50 of 3 to 200 µm; and
the fine particle compound (B) comprises particles having a particle size of 10 µm or less in a volume particle size distribution at 10 volume % or less.

5. The adsorbent according to claim 3, wherein:
the activated carbon comprises activated carbon particles; and
the activated carbon particles have a mode diameter of 0.06 to 0.6 mm.

6. An adsorbent comprising:
a fine particle compound (A) comprising an aluminosilicate compound; and
activated carbon particles;
wherein:
the fine particle compound (A) has a specific surface area of 300 m²/g or more and an average particle size D50 of 3 to 200 µm;
the fine particle compound (A) comprises particles having a particle size of 10 µm or less in a volume particle size distribution at 10 volume % or less;
the activated carbon particles have a mode diameter of 0.06 to 0.6 mm; and
an amount of aluminum eluted after 1 minute when a liquid passes through the adsorbent at a space velocity (SV) of 2300 hr⁻¹ is less than 100 ppb.

7. The adsorbent according to claim 1, wherein the activated carbon particles comprise coconut shell activated carbon.

8. A molded body comprising the adsorbent according to claim 1.

9. A water purifier comprising the adsorbent according to claim 1.

10. The adsorbent according to claim 3, wherein the activated carbon comprises coconut shell activated carbon.

11. A molded body comprising the adsorbent according to claim 3.

12. A water purifier comprising the adsorbent according to claim 3.

13. The adsorbent according to claim 6, wherein the proportion of the fine particle compound (A) to the adsorbent is 1 to 50 mass %.

14. The adsorbent according to claim 6, wherein the activated carbon is coconut shell activated carbon.

15. A molded body comprising the adsorbent according to claim 6.

16. A water purifier comprising the adsorbent according to claim 6.

17. An adsorbent comprising:
a fine particle compound (B) containing an aluminosilicate compound;
a plastic powder; and
activated carbon,
wherein:
the fine particle compound (B) and the plastic powder form composite aggregate particles,
the composite aggregate particles comprise particles having a particle size of 40 µm or less in a volume particle size distribution at 15 volume % or less, and
a ratio of silicon to aluminum as oxides ($SiO_2/Al_2O_3$) in the aluminosilicate compound is 3 or less.

* * * * *